United States Patent
Chee et al.

(10) Patent No.: US 7,012,781 B2
(45) Date of Patent: Mar. 14, 2006

(54) LAMINATED DISC DRIVE BASE

(75) Inventors: WaiOnn Chee, Singapore (SG); Niroot Jierapipatanakul, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 198 days.

(21) Appl. No.: 10/463,946

(22) Filed: Jun. 18, 2003

(65) Prior Publication Data

US 2004/0257697 A1     Dec. 23, 2004

(51) Int. Cl.
G11B 33/02      (2006.01)
G11B 33/14      (2006.01)

(52) U.S. Cl. ............................... 360/97.01; 360/97.02; 360/98.01

(58) Field of Classification Search ............. 360/97.01, 360/97.02, 97.03, 98.01, 99.01
See application file for complete search history.

(56) References Cited

U.S. PATENT DOCUMENTS

| | | | |
|---|---|---|---|
| 5,067,034 A * | 11/1991 | Kido | 360/74.1 |
| 5,414,574 A | 5/1995 | Boutaghou | 360/97.01 |
| 5,483,398 A * | 1/1996 | Boutaghou | 360/97.02 |
| 5,666,239 A | 9/1997 | Pottebaum | 360/97.03 |
| 5,757,580 A | 5/1998 | Andress | 360/97.02 |
| 5,822,152 A * | 10/1998 | Seaver et al. | 360/99.08 |
| 5,960,983 A * | 10/1999 | Chan | 220/666 |
| 6,178,061 B1 * | 1/2001 | Obara | 360/97.01 |
| 6,366,426 B1 | 4/2002 | Beatty | 360/97.02 |
| 6,469,864 B1 | 10/2002 | Kamezawa | 360/97.01 |
| 6,501,614 B1 | 12/2002 | Kang | 360/97.01 |
| 6,510,021 B1 | 1/2003 | Woldemar | 360/97.01 |
| 6,552,869 B1 * | 4/2003 | Takahashi et al. | 360/97.01 |
| 6,694,656 B1 * | 2/2004 | Flodin et al. | 40/781 |
| 6,762,906 B1 * | 7/2004 | Wakita et al. | 360/97.01 |
| 6,765,752 B1 * | 7/2004 | Watanabe et al. | 360/97.01 |
| 6,813,772 B1 * | 11/2004 | Ariyoshi | 720/600 |
| 2002/0141108 A1 | 10/2002 | Daniel | 360/97.01 |

* cited by examiner

*Primary Examiner*—Jefferson Evans
(74) *Attorney, Agent, or Firm*—Westman, Champlin & Kelly

(57) ABSTRACT

A base for use in a disc drive includes first and second base members that are each formed of a single sheet of material. The first base member includes first and second portions. The first portion of the first base member is laminated to the second base member to form a thick base portion. The second portion of the first base member is separated from the second base member to form a first thin bottom portion.

32 Claims, 6 Drawing Sheets

LAMINATED DISC DRIVE BASE

FIELD OF THE INVENTION

The present invention relates generally to disc drive storage devices, and more particularly, but not by limitation, to a base for disc drive storage devices.

BACKGROUND OF THE INVENTION

Disc drives are commonly used in work stations, personal computers, portable computers, and other computer systems to store large amounts of data in a form that can be made readily available to a user. In general, a disc drive comprises one or more magnetic discs that-are rotated by spindle motor at a constant high speed. The surface of each disc is divided into a series of data tracks which are spaced radially from one another across a band having an inner diameter and an outer diameter. The data tracks extend generally circumferentially around the discs and store data in the form of magnetic flux transitions within the radial extent of the tracks on the disc surfaces. Typically, each data track is divided into a number of data sectors that store fixed sized data blocks.

A head includes an inner active element such as a magnetic transducer which senses the magnetic transitions on a selected data track to read the data stored on the track, or to transmit an electrical signal that induces magnetic transitions on the selected data track to write data to the track. The head includes a read/write gap that positions the active elements of the head at a position suitable for interaction with the magnetic transitions on the data tracks of a disc as the disc rotates.

Each head is mounted to a track accessing arm that is rotated by an actuator to selectively position the head over a pre-selected data track of the disc to either read data from or write data to the pre-selected data track. The head includes a slider assembly having an air-bearing surface that causes the head to fly over the data tracks of the disc surface due to fluid air currents caused by rotation of the disc.

Typically, several discs are stacked on top of each other and the surfaces of the stacked discs are accessed by the heads mounted on a complimentary stack of track accessing arms that are attached to the actuator to form an actuator assembly. The actuator assembly generally includes head wires which conduct electrical signals from the heads to a flex circuit, which in turn conducts the electrical signals to a printed circuit board mounted to a base of the disc drive.

Continued demands exist for higher disc drive performance from disc drives having smaller form factors. Such demands require increases in spindle motor rotation speeds, increases in a real density recording capabilities, and faster data access times, along with decreases in the size of the disc drive components and the housing that encloses them. Standard disc drives used in personal computers are formed in accordance with a one-inch form factor (height). Such standard disc drives have been essentially miniaturized to form microdrives. Such microdrives typically have a 5.0 millimeter (mm) form factor and are formed in accordance with compact flash Type II specifications. One of the difficulties in meeting such a small form factor is the formation of the base of the microdrive that provides support for the components of the disc drive.

Disc drive bases are designed to provide the necessary structural integrity to support the mounting of internal disc drive components as well as to support attachment of the disc drive to a user environment. Typically, disc drive bases are formed from a casting process using aluminum and undergo secondary machining operations as required to form the requisite critical surfaces for proper alignment of the disc drive components. While structurally solid, such cast bases have limitations. For example, the formation of a base for a 5.0-mm form factor microdrive can push the limits of the casting process as typical wall thicknesses can be as small as 0.3 mm.

To meet the continued demands for ever decreasing form factors, such as the 3.3 mm form factor of compact flash Type I specifications, requires the development of new base designs utilizing alternative manufacturing processes. Embodiments of the present invention provide solutions to meet such disc drive base demands while offering other advantages over bases of the prior art.

SUMMARY OF THE INVENTION

The present invention generally relates to a base for use in a disc drive. The base includes first and second base members each formed of a single sheet of material. The first base member includes first and second portions. The first portion of the first base member is laminated to the second base member to form a thick base portion. The second portion of the first base member is separated from the second base member to form a first thin bottom portion.

Other features and benefits that characterize embodiments of the present invention will be apparent upon reading the following detailed description and review of the associated drawings.

DETAILED DESCRIPTION OF ILLUSTRATIVE EMBODIMENTS

Figure 1:
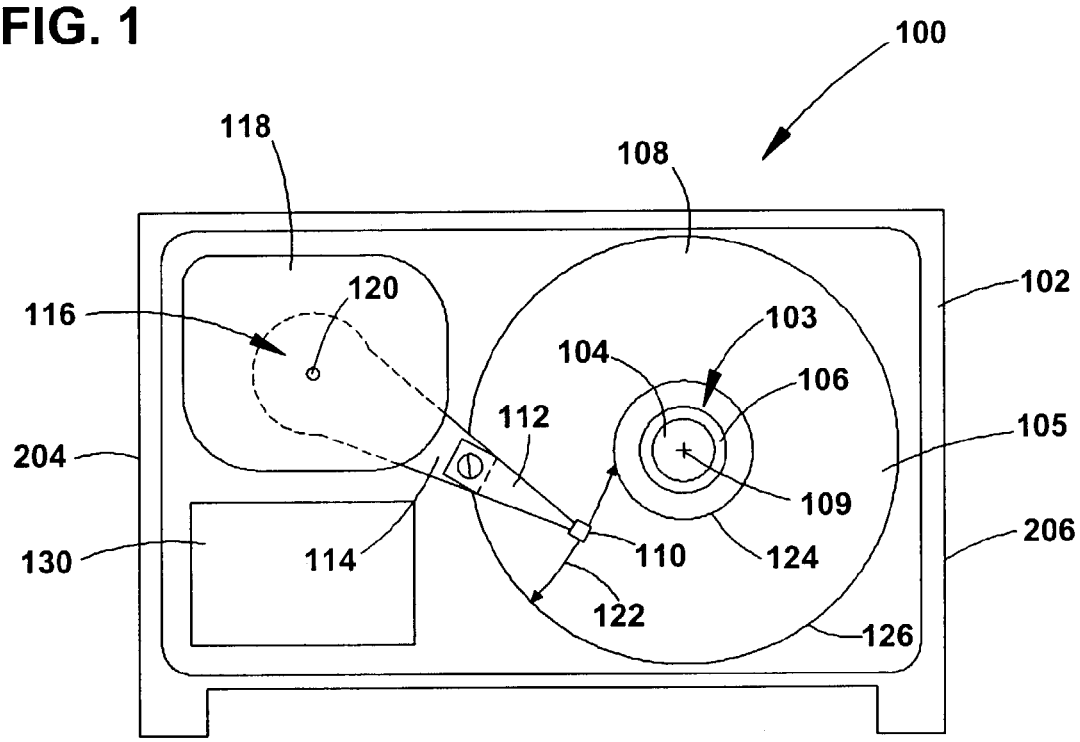
FIG. 1 is a simplified top plan view of a disc drive that includes a base in accordance with the present invention.

FIG. 1 is a simplified top plan view of a disc drive 100 that includes a base 102 in accordance with the present invention. A top cover (not shown) attaches to base 102 to form a disc drive housing. Disc drive 100 also includes a spindle assembly 103 that includes a spindle 104 that is rotated by a spindle motor (not shown). A disc pack 105 is mounted to spindle 104 by a disc clamp 106. Disc pack 105 includes one or more individual discs 108, which are mounted for co-rotation about a central axis 109 of spindle 104. Each disc surface has an associated disc head slider 110 which is mounted to disc drive 100 for communication with the disc surface. In the example shown in FIG. 1, sliders 110 are supported by suspensions 112 which are in turn attached to track accessing arms 114 of an actuator 116. The actuator 116 shown in FIG. 1 is of the type known as a rotary moving coil actuator and includes a voice coil motor, shown generally at 118. Voice coil motor 118 rotates actuator 116 with its attached heads 110 about a pivot shaft 120 to position heads 110 over a desired data track along an arcuate path 122 between a disc inner diameter 124 and a disc outer diameter 126. Voice coil motor 118 is driven by servo electronics 130 based on signals generated by heads 110 and a host computer (not shown).

In general, base 102 of the present invention includes two more base members that are each formed of individual sheets of material that are shaped using a stamping, blanking, deep drawing, or other process. The sheets are preferably aluminum, stainless steel, cold rolled steel, laminated aluminum, steel plates, or other suitable material. The multiple base members are laminated or joined together to form thick and thin portions of base 102. The thick base portions correspond to portions of base 102 where the multiple base members of material overlay each other. The thin base portions correspond to the portions of base 102 that are formed of only a single base member. This configuration for base 102 overcomes the wall thickness limitations of cast bases by forming the thinnest portions of the base using fewer base members than those used to create the thick base portions. As a result, bases 102 of the present invention can be formed having wall thicknesses that are much thinner and stronger than those that can be reliably formed by casting. Therefore, base 102 of the present invention can be used to meet the continuous demand for smaller disc drive form factors.

Figure 2:
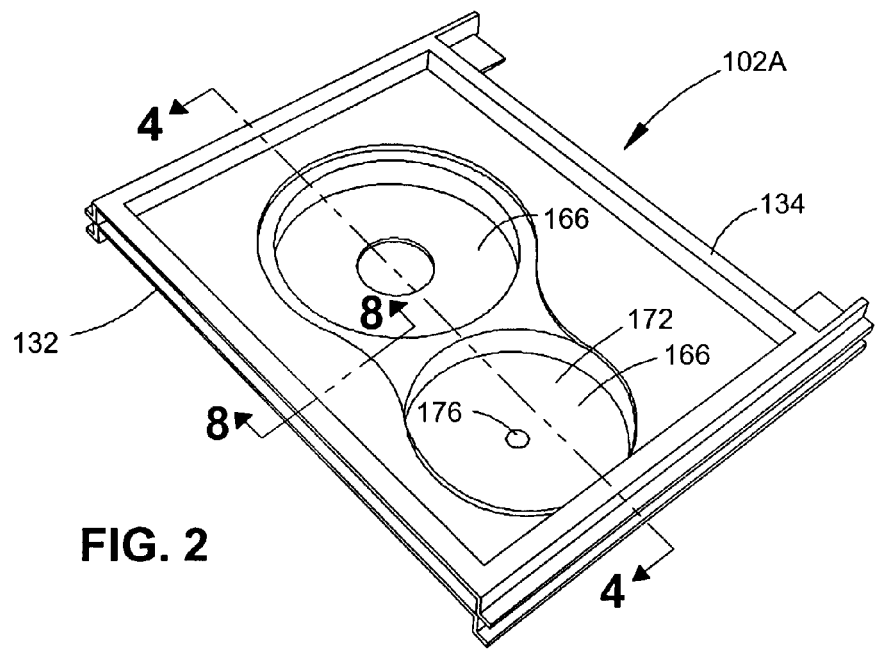
FIGS. 2 and 3 are assembled and exploded perspective views of a base in accordance with embodiments of the invention.
Figure 4:
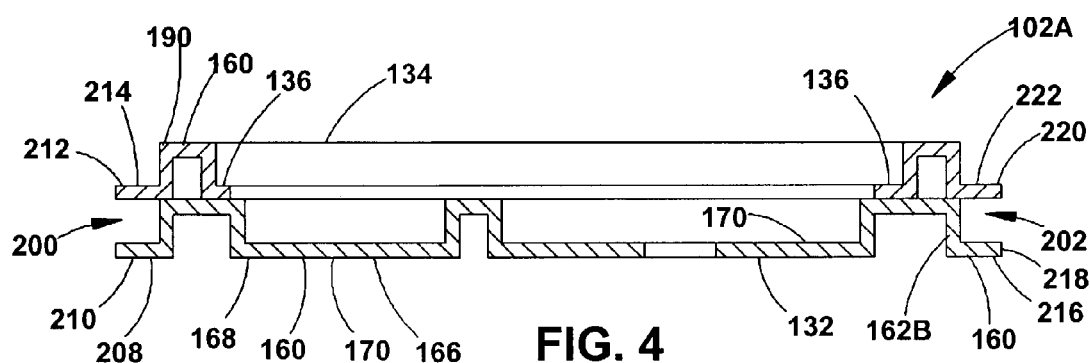
FIG. 4 is a cross-sectional view of the base of FIG. 2 taken generally along line 4—4.
Figure 3:
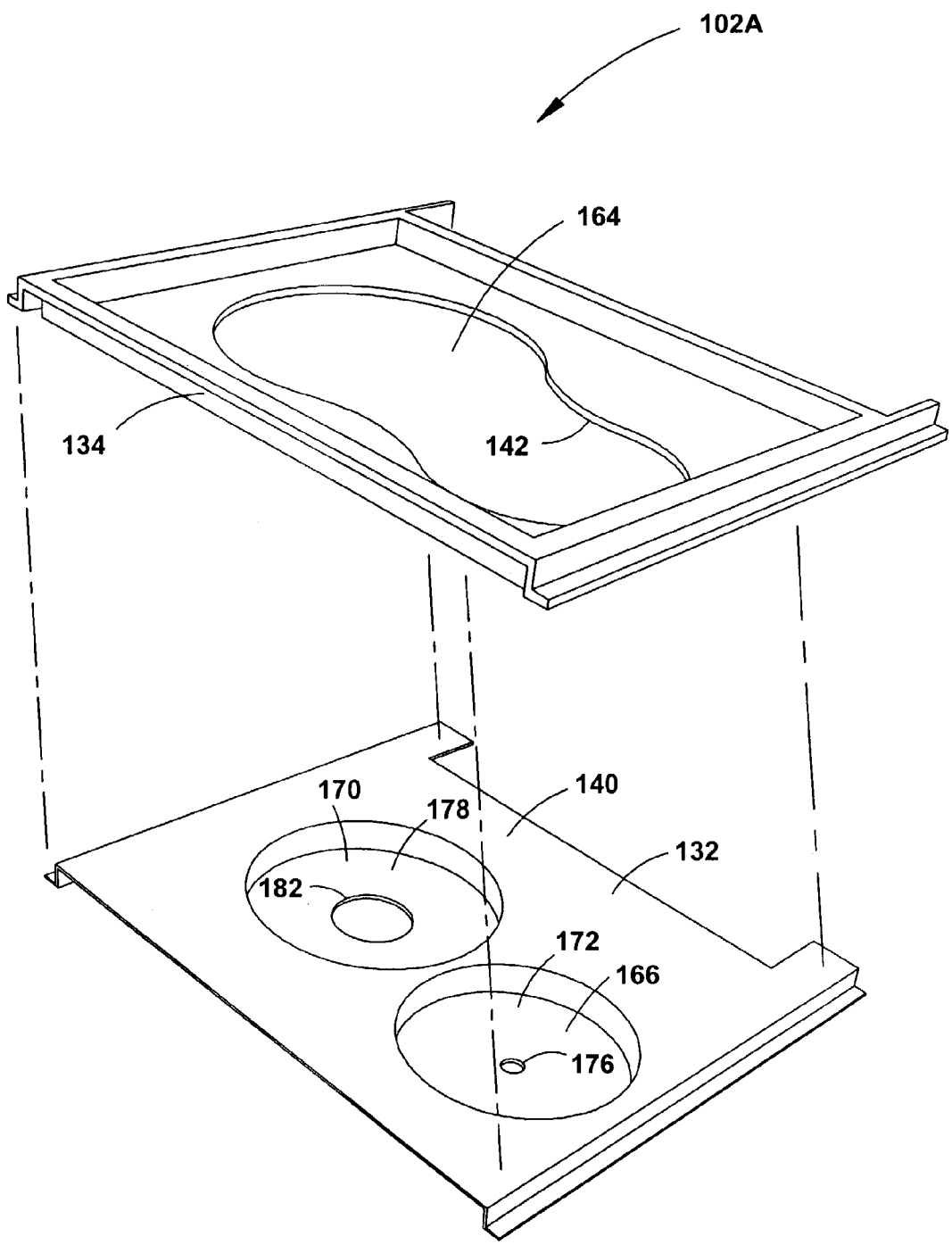
Figure 5:
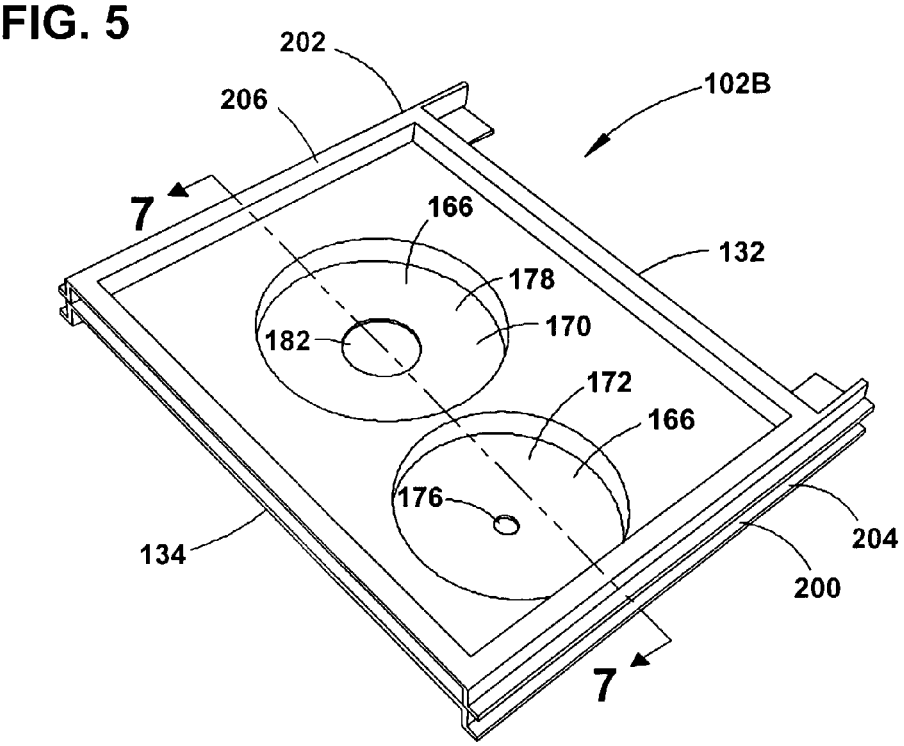
FIGS. 5 and 6 are assembled and exploded perspective views of a disc drive base in accordance with embodiments of the invention.
Figure 7:
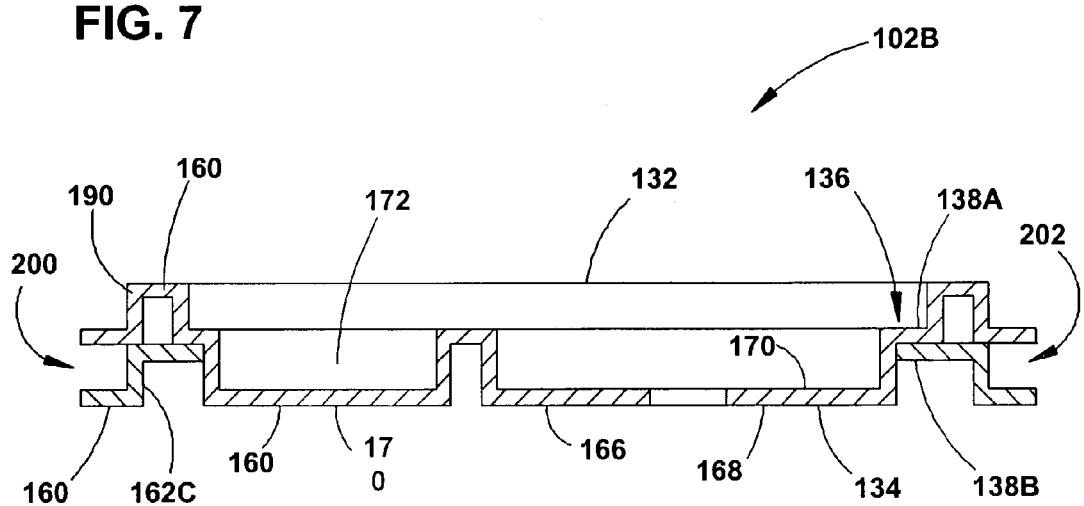
FIG. 7 is a cross-sectional view of the base of FIG. 5 taken generally along line 7—7.
Figure 6:
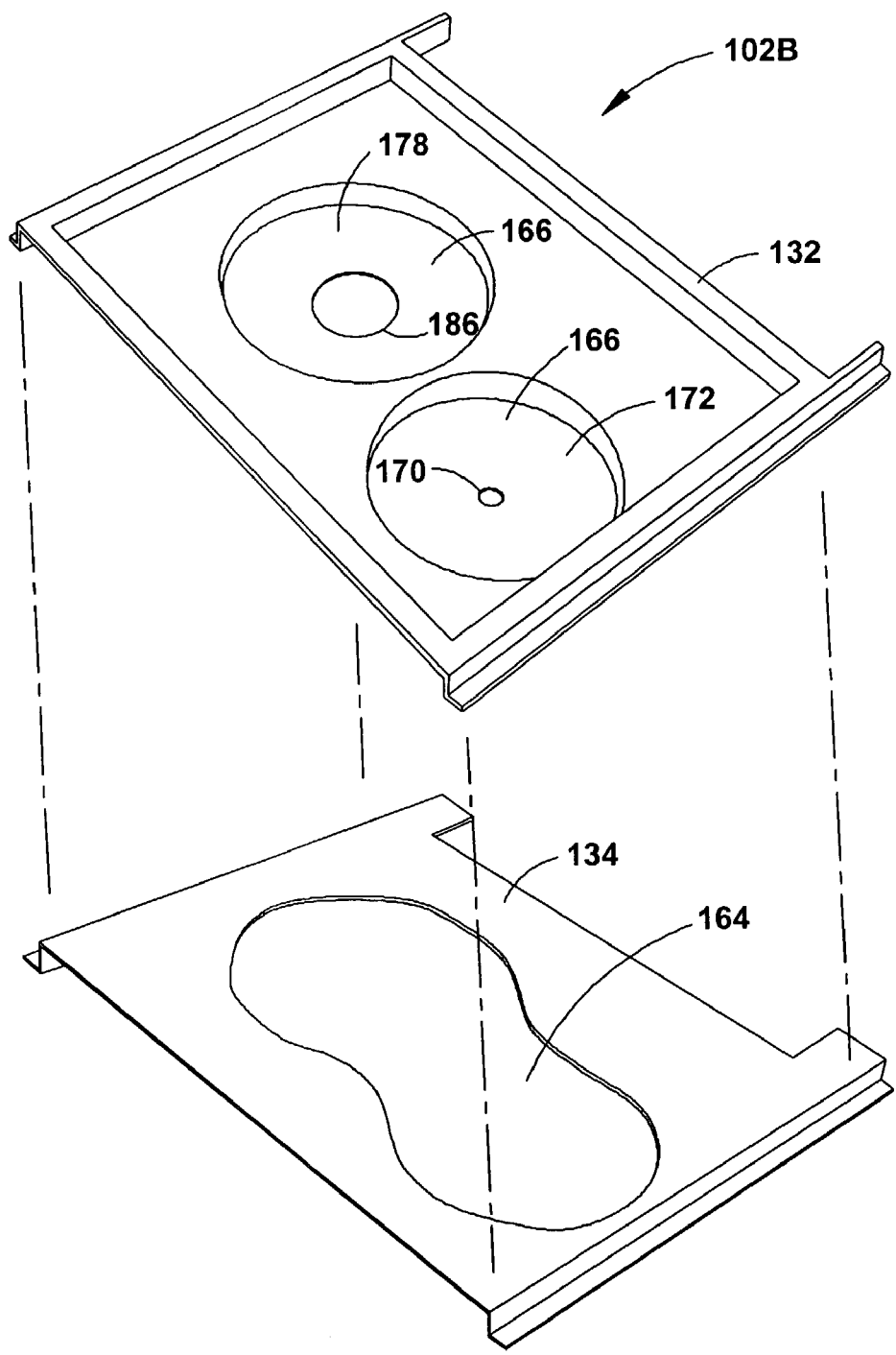

FIGS. 2 and 3 are perspective assembled and exploded views, respectively, of a base 102A in accordance with one embodiment of the invention. FIG. 4 is a cross-sectional view of the base 102A of FIG. 2 taken generally along line 4—4. FIGS. 5 and 6 are perspective assembled and exploded views of a base 102B in accordance with another embodiment of the invention. FIG. 7 is a cross-sectional view of base 102B taken generally along line 7—7 of FIG. 5. To simplify the discussion of the present invention, bases 102A and 102B will be referred to generally as base 102, and the sane or similar elements will be designated by the same or similar numbers.

Bases 102A and 102B include first and second base members 132 and 134 that are each formed from single sheets of material that are laminated or joined together, as mentioned above. The primary difference between base 102A and 102B is the relative location of first and second base members 132 and 134. First base member 132 underlies second base member 134 in base 102A, and first base member 132 overlays second base member 134 in base 102B.

Thick base portions 136 are formed where first portions 138 of first and second base members 132 and 134 overlay each other. For base 102A a top surface 140 of first portion 138A of first base member 132 is laminated or joined to and overlays a bottom surface 142 of a first portion 138B of second base member 134 to form a thick base portion 136, as shown in the partial cross-sectional view of FIG. 8 that is taken generally along line 8—8 of FIG. 2. Similarly, for base 102B, a bottom surface of first portion 138A of first base member 132 is laminated or joined to an underlaying top surface of a first portion 138B of second base member 134, as shown in FIG. 7.

First and second base members 132 and 134 can be laminated or joined together using any suitable means. In accordance with one embodiment of the invention shown in FIG. 8, a bonding layer 148 is used. Bonding layer 148 can be an adhesive layer, formed of a pressure-sensitive adhesive, a structural adhesive, an epoxy, or other adhesive. One embodiment of bonding layer 148 includes a core layer 150 of vibration dampening material positioned between adhesive layers on a top surface 152 and a bottom surface 154 to join first and second base members 132 and 134 together. Core layer 150 operates to suppress undesirable vibration and acoustic noise produced by disc drive 100 which could adversely affect its performance. Alternatively, first and second base members 132 and 134 can be joined together by spot welding, laser welding, crimping, riveting, or other means.

Figure 8:
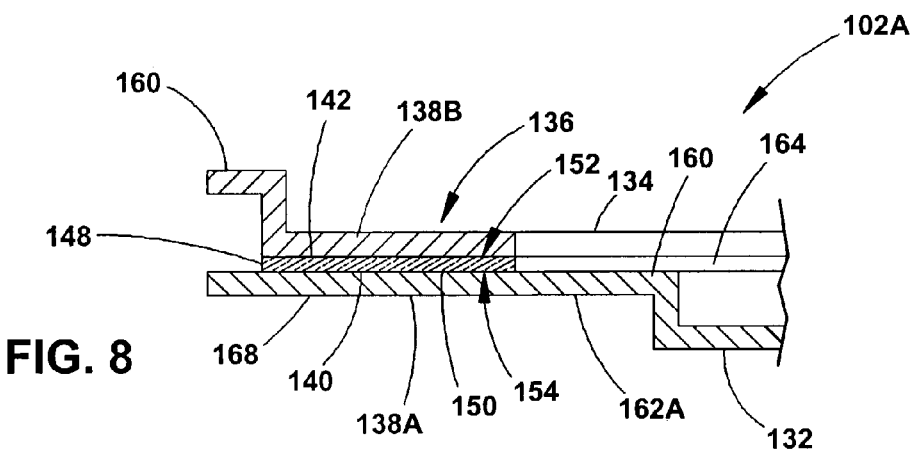
FIG. 8 is a partial cross-sectional view of the base of FIG. 2 taken generally along line 8—8.

First and second base members 132 and 134 of bases 102A and 102B each include second portions 160 that are separated from the other base member to form thin base portions 162. The separation can be due to a lack of overlapping portions of the first and second base members 132 and 134. For example, thin base portion 162A, shown in FIG. 8, is formed by second portion 160 of first base member 132 due to the exposure of first base member 132 by central opening 164 (FIG. 3) of second base member 134. The separation can also be formed as a result of a displacement of the second portions 160 of one base member from the other base member due to diverging first and second base members 132 and 134, such as at 162B and 162C of FIGS. 4 and 7, respectively.

One embodiment of the thin base portion 162 formed by a second portion 160 of first base member 132 includes a first thin bottom portion 166 that forms a portion of bottom 168 of base 102, as shown in FIGS. 4 and 7. In accordance with one embodiment of the invention, first thin bottom portion 166 defines a component support structure 170 that is sized to receive a component of disc drive 100. For base 102A, the component support structure 170 is exposed by central opening 164 of second base member 134, as shown in FIG. 4. For base 102B, the component support structure 170 of first base member 132 extends through central opening 164 of second base member 134, as shown in FIG. 7.

Figure 9:
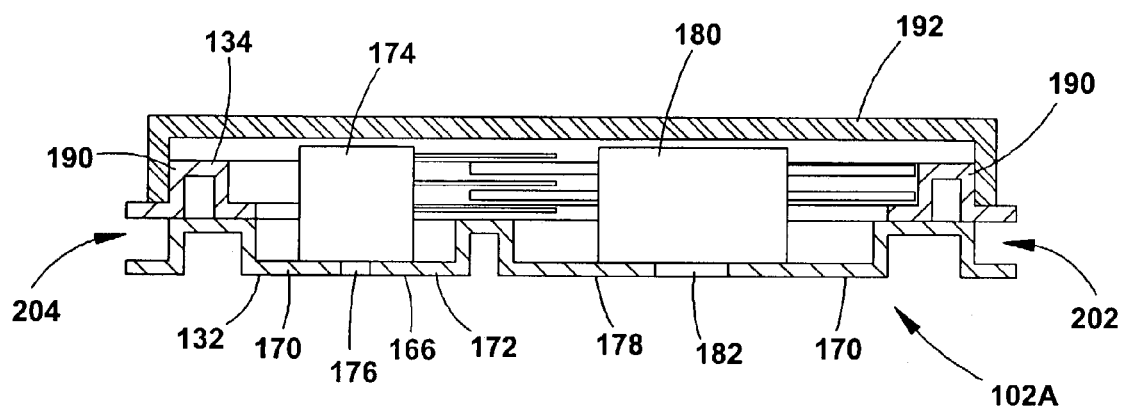
FIG. 9 is a simplified cross-sectional view of a disc drive in accordance with embodiments of the invention.

One embodiment of component support structure 170 includes an actuator receptacle 172 that is sized to receive an actuator assembly 174, as illustrated schematically in FIG. 9. Actuator receptacle 172 can include an aperture 176 for mounting the actuator assembly 174 therein and/or for receiving a pivot shaft 120 (FIG. 1) of actuator assembly 174. Another embodiment of component support structure 170 includes a spindle receptacle 178 that is configured to receive a spindle assembly 180 that includes a spindle motor, as illustrated schematically in FIG. 9. Spindle receptacle 178 can also include an aperture 182 for mounting the spindle assembly 184 therein, and/or receiving a rotatable spindle 104 (FIG. 1) of the spindle assembly 180.

The second portions 160 of first and second base members can also be formed into side walls 190, as shown in FIGS. 4 and 7, to increase the rigidity of base 102. Side walls 190 of the top base member are preferably configured to attach to a top cover 192 to enclose the components of disc drive 100, as illustrated in FIG. 9.

One embodiment of base 102 of the present invention includes opposing slots 200 and 202 at sides 204 and 206 that are formed in accordance with Type I and Type II compact flash specifications, as shown in FIGS. 4 and 7. Slot 200 is formed by a first slot portion 208 at an edge 210 of first base member 132 and a second slot portion 212 at an edge 214 of second base member 134. The first and second slot portions 208 and 212 form U-shaped slot 200 when first and second base members 132 and 134 are laminated or joined together. Likewise, slot 202 is formed by a third slot portion 216 at an edge 218 of first base member 132 and a fourth slot portion 220 at an edge 292 of second base member 134. The third and fourth slot portions 216 and 220 form U-shaped slot 202 when first and second base members 132 and 134 are laminated or joined together.

Base 102 of the present invention is formed by first providing first and second sheets of material that are formed into first and second base members 132 and 134 using a stamping, blanking, deep drawing, or other suitable process. Next, first and second base members 132 and 134 are aligned relative to each other such that corresponding first portions 138 overlay each other and second portions 160 of each base member are separated from the other. Some of the second portions 160 of first base member 132 form a first thin bottom portion 166. Finally, the first portions 138 of the first and second base members 132 and 138 are laminated or joined together to form thick base portions 136 to complete the base.

Additionally, slots 200 and 202 can be formed in the base 102 by first forming first and second slot portions 208 and 212 at edges 210 and 214 of first and second base members 132 and 134, respectively. Next, the first and second base members 132 and 134 are aligned to form U-shaped slots 200 and 202 respectively at sides 204 and 206 of base 102 with slot portions 208 and 212.

In summary, the present invention is directed to a base (such as 102) for use in a disc drive storage system (such as 100) that includes first and second base members (such as 132 and 134). The first base member is formed of a single sheet of material and includes first and second portions (such as 138 and 160). The second base member is formed of a single sheet of material and is laminated or joined to the first portion of the first base member to form a thick base portion (such as 136). Additionally, the second portion of the first base member is separated from the second base member to form a first thin bottom portion (such as 166).

In accordance with one embodiment of the invention, the first thin bottom portion defines a component support structure (such as 170). The component support structure can be an actuator receptacle (such as 172) that is sized to receive an actuator assembly (such as 174). The components of support structure can also include a spindle receptacle (such as 178) that is configured to receive a spindle assembly (such as 180).

The base of the present invention can also include slots (such as 200 and 202). The slots are formed by slot portions (such as 208 and 212) of the first and second base members.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. Accordingly, the particular elements may vary depending on the particular application for the base while maintaining substantially the same functionality and without departing from the scope and spirit of the present invention. For example, component support structures other than those describe herein can be formed using both thick and thin base portions. Also, more than two base members can be used to form the base of the present invention.

What is claimed is:

1. A base for use in a data storage system comprising:
   a first base member formed of a single sheet of material and including first and second portions;
   a second base member formed of a single sheet of material and including a first portion joined to the first portion of the first base member to form a thick base portion, wherein the second portion of the first base member is separated from the second base member to form a first thin bottom portion, and the second base member including a second portion that is separated from the first base member and forms a second thin base portion; and
   a component support structure defined by one of the first and second base members, the component support structure comprising a receptacle configured to receive a rotary component.

2. The base of claim 1, wherein the first and second base members are formed using a stamping or deep drawing process.

3. The base of claim 2, wherein the sheets forming the first and second base members have different thicknesses.

4. The base of claim 1, wherein the first thin bottom portion defines the component support structure.

5. The base of claim 1, wherein:
   the first thin bottom portion forms the component support structure; and
   the second base member includes a central opening exposing the component support structure.

6. The base of claim 1, wherein the rotary component comprises an actuator assembly or a spindle assembly.

7. The base of claim 1, wherein the second portion of the first base member forms a side wall.

8. The base of claim 1, wherein:
   the first base member includes an edge having a first slot portion; and
   the second base member includes an edge having a second slot portion, wherein the first and second slot portions form a first U-shaped slot.

9. The base of claim 1 including an adhesive layer joining the first portion of the first base member to the second base member.

10. The base of claim 1, including a core layer of vibration dampening material between the first portion of the first base member and the second base member.

11. A data storage system including:
    the base of claim 1;
    data storage medium; and
    a top cover joined to the base and enclosing the data storage medium.

12. A base for use in a disc drive storage system comprising:
    a first base member formed of a single sheet of material and including first and second portions;
    a second base member formed of a single sheet of material and joined to the first portion of the first base member to form a thick base portion, wherein the second portion of the first base member is separated from the second base member to form a first thin bottom portion; and
    a layer of vibration dampening material between the first portion of the first base member and the second base member.

13. The base of claim 12, wherein the sheets forming the first and second base members have different thicknesses.

14. The base of claim 12, wherein the first thin bottom portion defines a component support structure.

15. The base of claim 14, wherein the component support structure includes an actuator receptacle sized to receive an actuator assembly.

16. The base of claim 14, wherein the component support structure includes a spindle receptacle sized to receive a spindle assembly.

17. The base of claim 12, wherein:
the first thin bottom portion forms a component support structure; and
the second base member includes a central opening exposing the component support structure.

18. The base of claim 17, wherein the component support structure is a receptacle configured to receive an actuator assembly or a spindle assembly.

19. The base of claim 12, wherein the second portion of the first base member forms a side wall.

20. The base of claim 12, wherein:
the first base member includes an edge having a first slot portion; and
the second base member includes an edge having a second slot portion, wherein the first and second slot portions form a first U-shaped slot.

21. The base of claim 20, wherein:
the first base member includes a third slot portion opposite the first slot portion; and
the second base member includes a fourth slot portion opposite the second slot portion, wherein the third and fourth slot portions form a second U-shaped slot.

22. The base of claim 12, wherein the layer of vibration dampening material includes an adhesive layer joining the first portion of the first base member to the second base member.

23. The base of claim 12, wherein the second base member includes a first portion attached to the first portion of the first base member to form the thick base portion, and a second portion that is separated from the first base member and forms a second thin base portion.

24. A disc drive storage system including:
the base of claim 12;
an actuator assembly received by the base;
a spindle assembly received by the base;
a disc rotatably supported by the spindle assembly; and
a top cover joined to the base and enclosing the actuator assembly, the spindle assembly and the disc.

25. A data storage device including:
a base comprising:
a first base member formed of a single sheet of material and including first and second portions; and
a second base member formed of a single sheet of material and including a first portion joined to the first portion of the first base member to form a thick base portion, wherein the second portion of the first base member is separated from the second base member to form a first thin bottom portion, and the second base member including a second portion that is separated from the first base member and forms a second thin base portion;
a data storage medium; and
a top cover joined to the base and enclosing the data storage medium.

26. The device of claim 25, wherein the base includes a receptacle.

27. The device of claim 26 including an actuator assembly received in the receptacle.

28. The device of claim 26 including a spindle assembly received in the receptacle.

29. The device of claim 25 including vibration dampening material between the first portion of the first base member and the second base member.

30. The device of claim 25, wherein:
the first thin bottom portion forms the receptacle; and
the second base member includes a central opening exposing the receptacle.

31. The device of claim 25, wherein:
the first base member includes an edge having a first slot portion; and
the second base member includes an edge having a second slot portion, wherein the first and second slot portions form a first U-shaped slot.

32. The device of claim 25, wherein the data storage medium comprises a rotating disc.

* * * * *